US012745035B2

(12) United States Patent
Zhu et al.

(10) Patent No.: US 12,745,035 B2
(45) Date of Patent: Sep. 22, 2026

(54) AUDIO ELECTRONIC DEVICE AND WIND NOISE CONTROL METHOD FOR MICROPHONE THEREOF

(71) Applicant: GOERTEK INC., Weifang (CN)

(72) Inventors: Zongxia Zhu, Weifang (CN); Kang An, Weifang (CN); Jie Wu, Weifang (CN)

(73) Assignee: GOERTEK INC., Weifang (CN)

( * ) Notice: Subject to any disclaimer, the term of this patent is extended or adjusted under 35 U.S.C. 154(b) by 131 days.

(21) Appl. No.: 18/884,354

(22) Filed: Sep. 13, 2024

(65) Prior Publication Data

US 2025/0008260 A1 Jan. 2, 2025

Related U.S. Application Data

(63) Continuation of application No. PCT/CN2022/124133, filed on Oct. 9, 2022.

(30) Foreign Application Priority Data

Jul. 29, 2022 (CN) ......................... 202210913802.6

(51) Int. Cl.

*H04R 1/04* (2006.01)
*H04R 3/00* (2006.01)
*H04R 29/00* (2006.01)

(52) U.S. Cl.

CPC ................. *H04R 3/00* (2013.01); *H04R 1/04* (2013.01); *H04R 29/004* (2013.01); *H04R 2410/07* (2013.01)

(58) Field of Classification Search

CPC .......... H04R 3/00; H04R 1/04; H04R 29/004; H04R 2410/07

See application file for complete search history.

(56) References Cited

U.S. PATENT DOCUMENTS

2017/0330583 A1 11/2017 Lee et al.
2019/0238962 A1* 8/2019 Döner .................... H04R 1/083
2021/0211532 A1* 7/2021 See ...................... H04R 1/1041

FOREIGN PATENT DOCUMENTS

CN 201663622 U 12/2010
CN 105744439 A 7/2016
CN 109561364 A 4/2019
(Continued)

OTHER PUBLICATIONS

First Office Action in Corresponding Chinese Application No. 202210913802.6, dated Mar. 17, 2023; 12 pgs.
(Continued)

*Primary Examiner* — Joseph Saunders, Jr.
(74) *Attorney, Agent, or Firm* — HAUPTMAN HAM, LLP

(57) ABSTRACT

Disclosed are an audio electronic device and a wind noise control method for a microphone of the audio electronic device. The wind noise control method for the microphone of the audio electronic device comprises: obtaining wind noise picked up by the microphone at a current position of the microphone; and in response to that the wind noise at the current position is greater than a first set value, controlling the driving device to drive the microphone until the wind noise at the current position of the microphone is less than a second set value, wherein the second set value is less than or equal to the first set value.

8 Claims, 3 Drawing Sheets

(56) References Cited

FOREIGN PATENT DOCUMENTS

| | | | |
|---|---|---|---|
| CN | 110012143 | A | 7/2019 |
| CN | 110970052 | A | 4/2020 |
| CN | 114264365 | A | 4/2022 |
| JP | 2014036395 | A | 2/2014 |
| WO | 2020220990 | A1 | 11/2020 |

OTHER PUBLICATIONS

Grant Notification in Corresponding Chinese Application No. 202210913802.6, dated Aug. 16, 2023; 5 pgs.
International Search Report and Written Opinion in Corresponding International Application No. PCT/CN2022/124133, mailed Mar. 17, 2023; 11 pgs.
Li et al., Identification of Sound Source Based on Microphone Array, Electrical Automation, Issue 4, dated Apr. 2013; 4 pgs.
Teutsch et al., An adaptive close-talking microphone array, IEEE, dated Oct. 24, 2001; 4 pgs.

* cited by examiner

AUDIO ELECTRONIC DEVICE AND WIND NOISE CONTROL METHOD FOR MICROPHONE THEREOF

CROSS-REFERENCE TO RELATED APPLICATIONS

The present application is a continuation application of International Application No. PCT/CN2022/124133, filed on Oct. 9, 2022, which claims priority to Chinese patent application No. 202210913802.6, entitled in “AUDIO ELECTRONIC DEVICE AND WIND NOISE CONTROL METHOD FOR MICROPHONE THEREOF” and filed on Jul. 29, 2022. The disclosures of the above-mentioned applications are incorporated herein by reference in their entireties.

TECHNICAL FIELD

The present application relates to the technical field of electronic device, and in particular to a wind noise control method for a microphone of an audio electronic device.

BACKGROUND

Audio electronic device refers to electronic device including microphones. Taking augmented reality (AR) glasses as an example, AR glasses are daily wear products, especially sport glasses, which need to be used daily during outdoor running and cycling. When used in outdoor environments, if the wind blows to the microphone, the microphone will receive obvious wind noise, which is what we often call wind noise.

Wind noise is a very important factor affecting call quality. Therefore, controlling wind noise and increasing human voice pickup are important technical directions for headphones and smart audio glasses.

SUMMARY

The main purpose of the present application is to provide a wind noise control method for a microphone of an audio electronic device, which is intended to be able to adjust the current wind noise of the microphone.

In order to achieve the above purpose, the present application provides a wind noise control method for a microphone of an audio electronic device, which is applied to the audio electronic device, the audio electronic device includes a housing, the microphone, a driving device and a control device electrically connected to the driving device; the housing is provided with a pipeline, and the microphone is movably provided along a length direction of the pipeline; the driving device is configured to drive a movement of the microphone;

the wind noise control method for the microphone of the audio electronic device includes:

obtaining wind noise picked up by the microphone at a current position of the microphone; and in response to that the wind noise at the current position is greater than a first set value, controlling the driving device to drive the microphone until the wind noise at the current position of the microphone is less than a second set value; the second set value is less than or equal to the first set value.

In an embodiment, the in response to that the wind noise at the current position is greater than the first set value, controlling the driving device to drive the microphone until the wind noise at the current position of the microphone is less than the second set value includes:

in response to that the wind noise at the current position is greater than the first set value, controlling the driving device to drive the movement of the microphone;

in response to that a set condition is reached, obtaining the wind noise picked up by the microphone at the current position of the microphone;

determining whether the wind noise at the current position is less than the second set value; and in response to that the wind noise at the current position is less than the second set value, controlling the driving device to stop working.

In an embodiment, in the step of in response to that the set condition is reached, obtaining the wind noise picked up by the microphone at the current position of the microphone, the set condition includes moving the microphone a set distance.

In an embodiment, after the in response to that the wind noise at the current position is greater than the first set value, controlling the driving device to drive the microphone until the wind noise at the current position of the microphone is less than the second set value, the method further includes:

re-obtaining the wind noise picked up by the microphone at the current position of the microphone.

In an embodiment, after the re-obtaining the wind noise picked up by the microphone at the current position of the microphone, the method further includes:

in response to that the wind noise at the current position is less than a third set value, controlling the microphone to move to an initial position; the third set value is less than the second set value.

The present application also provides an audio electronic device, including:

a housing provided with a pipeline; and a microphone movably and adjustably provided in the pipeline along a length direction of the pipeline.

In an embodiment, the audio electronic device further includes:

a driving device drivingly connected to the microphone to drive a movement of the microphone; and a control device electrically connected to the driving device.

In an embodiment, the control device includes a memory, a processor, and a wind noise control program for the microphone of the audio electronic device stored in the memory; when the wind noise control program for the microphone of the audio electronic device is executed by the processor, the steps of the wind noise control method for the microphone of the audio electronic device are realized.

In an embodiment, the pipeline is provided in an arc shape; the driving device includes a rotation device and a connection rod, and the connection rod is configured to extend along a radial direction of a rotation shaft of the rotation device; one end of the connection rod is connected to the rotation shaft of the rotation device, and the other end of the connection rod is connected to the microphone.

In an embodiment, the audio electronic device includes augmented reality (AR) glasses or headphones.

In the technical solution provided by the present application, the wind noise control method for the microphone of the audio electronic device includes the following steps: obtaining wind noise picked up by the microphone at a current position of the microphone; and in response to that the wind noise at the current position is greater than a first set value, controlling the driving device to drive the microphone until the wind noise at the current position of the microphone is less than a second set value; the second set value is less than or equal to the first set value. That is, in the technical solution of the present application, when the wind noise at the current position of the microphone is large, the driving device is controlled to drive the microphone activity to move so that the wind noise at the position of the microphone is at a smaller wind noise value, that is, less than the second set value; then when speaking through the microphone, the wind noise will have less impact on the voice because the value is smaller.

BRIEF DESCRIPTION OF THE DRAWINGS

In order to explain the embodiments of the present application or the technical solutions in the related art more clearly, the drawings needed to be used in the description of the embodiments or the related art will be briefly introduced below. Obviously, the drawings in the following description are only some embodiments of the present application. For those skilled in the art, other drawings can be obtained based on the structures shown in these drawings without exerting creative efforts.

Figure 1:
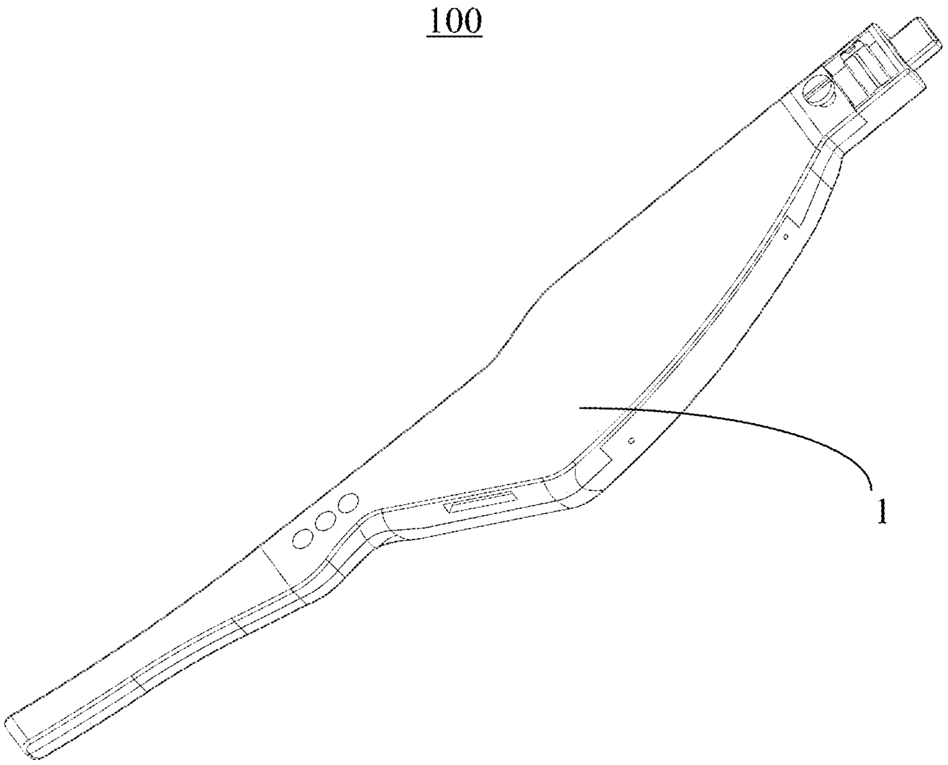
FIG. 1 is a three-dimensional schematic view of an audio electronic device according to an embodiment of the present application.

The realization of the purpose, functional features and advantages of the present application will be further described with reference to the embodiments and the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some, not all, of the embodiments of the present application. Based on the embodiments of the present application, all other embodiments obtained by those skilled in the art without making creative efforts fall within the protection scope of the present application.

It should be noted that if the embodiments of the present application involve directional indications (such as up, down, left, right, front, back . . . ), then the directional indications are only used to explain the relative positional relationship, movement conditions, etc. between the components under the a certain posture (as shown in the drawings). If the specific posture changes, the directional indications will also change accordingly.

In addition, if there are descriptions involving "first", "second", etc. in the embodiments of the present application, the descriptions of "first", "second", etc. are only for descriptive purposes and shall not be understood as indications or implications of its relative importance or implicit indication of the number of technical features indicated. Therefore, features defined as "first" and "second" may explicitly or implicitly include at least one of these features. In addition, the meaning of "and/or" appearing in the entire text includes three parallel solutions. Taking "A and/or B" as an example, it includes solution A, or solution B, or a solution that satisfies both A and B at the same time. In addition, the technical solutions in various embodiments can be combined with each other, but it must be based on the realization by those skilled in the art. When the combination of technical solutions is contradictory or cannot be realized, it should be considered that such a combination of technical solutions does not exist, nor within the protection scope required by the present application.

Before the improvement of the present application, the position of the microphone in the audio electronic device is fixed. For this reason, when the wind blows to the microphone in the environment, the microphone will receive obvious wind sound, which is what we often call wind noise; especially as for audio electronic devices being sports glasses, they need to be used daily during outdoor running and cycling. During their use, the problem of wind noise is particularly obvious.

Figure 2:
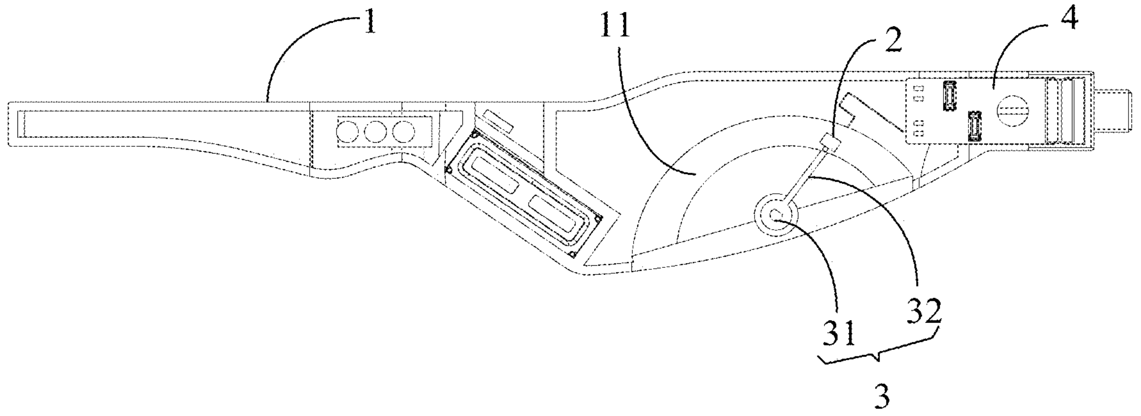
FIG. 2 is a schematic view of the audio electronic device in FIG. 1 after a housing is opened.

In view of this, the present application provides an audio electronic device. FIGS. 1 to 2 illustrate an embodiment of the audio electronic device provided by the present application. The audio electronic device is an electronic device with a microphone. The audio electronic device can be, but not limited to, virtual reality (VR) glasses, headphones and other VR products. Obviously, the electronic device can also be a computer, a smart phone, etc. For this reason, this design does not limit the specific type of the audio electronic device. Specifically, in the embodiments of the present application, the audio electronic device is VR glasses.

Please referring to FIGS. 1 to 2. The audio electronic device 100 includes a housing 1 and a microphone 2. The housing 1 is provided with a pipeline 11. The microphone 2 is movably and adjustably disposed along the length direction of the pipeline 11. In the pipeline 11, when the microphone 2 is located at different depths of the pipeline 11, under the same external environment, the wind noise will be different. The closer to the depth of the pipeline 11, the wind speed will decrease, and the wind noise also decreases. Therefore, when the wind noise is large, the position of the microphone 2 can be adjusted so that the wind noise at the current position of the microphone 2 decreases. In this way, the impact of wind noise on voice can be reduced.

What needs to be pointed out here is that, theoretically, when the microphone 2 moves in the pipeline 11, the pickup of the voice by the microphone 2 will also be affected, but the impact on the voice is smaller than the impact on the wind noise. Therefore, in this design, only the wind noise value can be picked up to adjust the position of the microphone 2. Obviously, in an embodiment of the present application, the voice value of the microphone 2 at the current position can also be obtained, and then the position of microphone 2 is determined according to the voice value and the value of the microphone 2.

The microphone 2 is movably and adjustably provided in the pipeline 11 along the length direction of the pipeline 11. There is no limitation in this design on how to adjust the position of the microphone 2. The position of the microphone 2 can be adjusted manually, so that the user can choose a suitable position according to the size of the wind noise. In the embodiment of the present application, the audio electronic device 100 also includes a driving device 3 and a control device 4. The driving device 3 and the microphone 2 are connected drivingly to drive the movement of the microphone 2, and the control device 4 is electrically connected to the driving device 3. The control device 4 includes a memory, a processor, and the wind noise control program of the microphone 2 of the audio electronic device 100 stored in the memory. The processor executes the wind noise control program of the microphone 2 of the audio electronic device 100 to implement the following wind noise control method for the microphone 2 of the audio electronic device 100:

Obtaining wind noise picked up by the microphone at a current position of the microphone; and In response to that the wind noise at the current position is greater than a first set value, controlling the driving device to drive the microphone until the wind noise at the current position of the microphone is less than a second set value; the second set value is less than or equal to the first set value.

In an embodiment, when the wind noise at the current position is greater than the first set value, the driving device 3 is controlled to drive the microphone 2 to move until the wind noise at the current position of the microphone 2 is less than the second set value. The above step includes:

When the wind noise at the current position is greater than the first set value, the driving device 3 is controlled to drive the microphone 2 to move;

Whenever a set condition is reached, the wind noise at the current position of the microphone 2 picked up by the microphone 2 is obtained;

It is determined whether the wind noise at the current position is less than the second set value;

If so, the driving device 3 is controlled to stop working.

In an embodiment, in the step of obtaining the wind noise picked up by the microphone 2 at the current position of the microphone 2 every time a set condition is reached, the set condition includes the microphone 2 moving a set distance.

In an embodiment, when the wind noise at the current position is greater than the first set value, the driving device 3 is controlled to drive the microphone 2 to move until the wind noise at the current position of the microphone 2 is less than the second set value. After the above step, the method also includes:

Re-obtaining the wind noise picked up by microphone 2 at the current position of microphone 2.

In an embodiment, after the step of re-obtaining the wind noise picked up by microphone 2 at the current position of microphone 2, the method includes:

When the wind noise at the current position is less than a third set value, the microphone 2 is controlled to move to the initial position, and the third set value is less than the second set value.

In one embodiment of the present application, the driving device 3 drives the microphone 2 to move. The specific structure of the driving device 3 is not limited. In the embodiment of the present application, the pipeline 11 is provided in an arc shape. The driving device 3 includes a rotation device 31 (specifically a motor, more specifically a stepper motor) and a connection rod 32. The connection rod 32 extends along the radial direction of the rotation shaft of the rotation device 31; one end of the connection rod 32 is connected to the rotation shaft of the rotation device 31, and the other end is connected to the microphone 2. Specifically, a long groove is provided on one side wall of the pipeline 11, and one end of the connection rod 32 passes through the long groove and is rotatably connected to the microphone 2.

In addition, the microphone 2 is also electrically connected to the control device 4, which may be wireless or wired. In the case of wired connection, the microphone 2 and the control device 4 are connected through a cable, and sufficient length is reserved for the cable to prevent the cable from moving along with the microphone 2 when it moves.

Obviously, the present application adjusts the wind noise by adjusting the position of the microphone 2 in the pipeline 11. Obviously, the opening size of the pipeline 11 can be controlled at the pipeline 11, so as to reduce the wind noise by adjusting the position.

Figure 3:
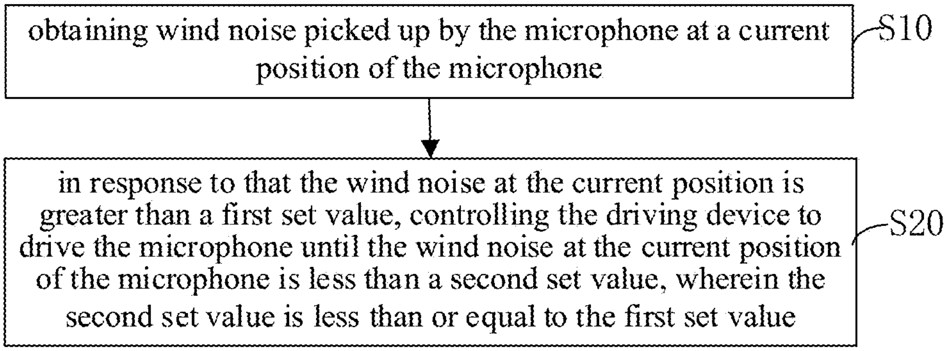
FIG. 3 is a schematic flowchart of a wind noise control method for a microphone of an audio electronic device according to an embodiment of the present application.

The present application also provides a wind noise control method for the microphone 2 of the audio electronic device 100. FIG. 3 is an embodiment of the wind noise control method for the microphone 2 of the audio electronic device 100 provided by the present application. Please referring to FIGS. 1 to 3, the audio electronic device 100 includes a housing 1, a microphone 2, a driving device 3 and a control device 4 electrically connected to the driving device 3. The housing 1 is provided with a pipeline 11, and the microphone 2 is movably provided along the length direction of the pipeline 11. The driving device 3 drives the microphone 2 to move. The wind noise control method for the microphone 2 of the audio electronic device 100 includes the following steps:

Step S10: obtaining the wind noise at the current position of the microphone 2 picked up by the microphone 2. Specifically, the microphone 2 will pick up the wind noise signal, and the control device 4 can obtain the wind noise value according to the wind noise signal;

Step S20: when the wind noise at the current position is greater than the first set value, controlling the driving device 3 to drive the microphone 2 to move until the wind noise at the current position of the microphone 2 is less than the second set value; the second set value is less than or equal to the first set value. For example, in an embodiment of the present application, the first set value is 60 dB and the second set value is 40 dB.

In the technical solution provided by the present application, the wind noise control method for the microphone 2 of the audio electronic device 100 includes the following steps: obtaining the wind noise at the current position of the microphone 2 picked up by the microphone 2; when the wind noise at the current position is greater than the first set value, the driving device 3 is controlled to drive the microphone 2 to move until the wind noise at the current position of the microphone 2 is less than the second set value; the second set value is less than or equal to the first set value. That is, in the technical solution of the present application, when the wind noise at the current position of the microphone 2 is large, the driving device 3 is controlled to drive the microphone 2 to move, so that the wind noise at the position of the microphone 2 is at a smaller wind noise value, that is, smaller than the second set value. At this time, when speaking through microphone 2, the wind noise value is smaller and has less impact on the voice.

In an embodiment of the present application, step S20 includes:

Step S21: when the wind noise at the current position is greater than the first set value, controlling the driving device 3 to drive the microphone 2 to move;

When the wind noise is large, the position of the microphone 2 needs to be adjusted so that the microphone 2 is in a deeper position in the pipeline 11 to reduce the wind noise;

Step S22: whenever a set condition is reached, obtaining the wind noise at the current position of the microphone 2 picked up by the microphone 2;

Every time a set condition is reached, the wind noise at the current position of the microphone 2 picked up by the microphone 2 is started to be obtained, instead of continuously obtaining, the amount of calculation can be reduced, and there is no limit to the set condition, which can be the set time, and can also be anything else. In the embodiment of the present application, the set condition includes the microphone 2 moving a set distance, for example, the set distance is 2 mm. That is, every time the microphone 2 moves 2 mm, the control device 4 obtains the noise at the current position of microphone 2 once.

Step S23: determining whether the wind noise at the current position is less than the second set value;

Step S24: if yes, controlling the driving device 3 to stop working.

In an embodiment of the present application, after step S20, the method further includes: re-obtaining the wind noise at the current position of the microphone 2 picked up by the microphone 2, that is, returning to step S10 to start the next cycle.

In an embodiment of the present application, after the step of re-obtaining the wind noise at the current position of the microphone 2 picked up by the microphone 2, the method further includes: when the wind noise at the current position is less than a third set value, controlling the microphone 2 to move to the initial position; the third set value is smaller than the second set value. For example, the third set value can be 10 dB. In this way, when the wind noise is small, the microphone 2 is moved to the initial position to maintain a better voice effect.

It should be noted that, as used herein, the terms "include", "comprise" or any other variation thereof are intended to cover a non-exclusive inclusion, such that a process, method, article or system that includes a list of elements not only includes those elements, but also includes other elements not expressly listed or that are inherent to the process, method, article or system. Without further limitation, an element defined by the statement "comprises a . . . " does not exclude the presence of other identical elements in the process, method, article, or system that includes that element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is the better implementation. Based on this understanding, the technical solution of the present application can be embodied in the form of a software product that is essentially or contributes to the existing technology. The computer software product is stored in a storage medium (such as ROM/RAM, magnetic disk, optical disk), including several instructions to cause a terminal device (which can be a mobile phone, computer, server, or network device, etc.) to execute the methods described in various embodiments of the present application.

The above are only some embodiments of the present application, and are not intended to limit the patent scope of the present application. Any equivalent structure or equivalent process transformation made using the contents of the description and drawings of the present application, or directly or indirectly used in other related technical fields, are all equally included in the patent scope of the present application.

What is claimed is:

1. A wind noise control method for a microphone of an audio electronic device, applied to the audio electronic device, wherein the audio electronic device comprises a housing, the microphone, a driving device and a control device electrically connected to the driving device; the housing is provided with a pipeline, and the microphone is movably provided along a length direction of the pipeline; the driving device is configured to drive a movement of the microphone;

wherein the wind noise control method for the microphone of the audio electronic device comprises:

obtaining wind noise picked up by the microphone at a current position of the microphone; and in response to that the wind noise at the current position is greater than a first set value, controlling the driving device to drive the microphone until the wind noise at the current position of the microphone is less than a second set value, wherein the second set value is less than or equal to the first set value;

after the in response to that the wind noise at the current position is greater than the first set value, controlling the driving device to drive the microphone until the wind noise at the current position of the microphone is less than the second set value, the method further comprises:

re-obtaining the wind noise picked up by the microphone at the current position of the microphone;

after the re-obtaining the wind noise picked up by the microphone at the current position of the microphone, the method further comprises:

in response to that the wind noise at the current position is less than a third set value, controlling the microphone to move to an initial position, wherein the third set value is less than the second set value.

2. The wind noise control method for the microphone of the audio electronic device according to claim 1, wherein the in response to that the wind noise at the current position is greater than the first set value, controlling the driving device to drive the microphone until the wind noise at the current position of the microphone is less than the second set value comprises:

in response to that the wind noise at the current position is greater than the first set value, controlling the driving device to drive the movement of the microphone;

in response to that a set condition is reached, obtaining the wind noise picked up by the microphone at the current position of the microphone;

determining whether the wind noise at the current position is less than the second set value; and in response to that the wind noise at the current position is less than the second set value, controlling the driving device to stop working.

3. The wind noise control method for the microphone of the audio electronic device according to claim 2, wherein in the step of in response to that the set condition is reached, obtaining the wind noise picked up by the microphone at the current position of the microphone, the set condition comprises moving the microphone a set distance.

4. The wind noise control method for the microphone of the audio electronic device according to claim 3, wherein the set distance is 2 mm.

5. The wind noise control method for the microphone of the audio electronic device according to claim 1, wherein the first set value is 60 dB, the second set value is 40 dB, and the third set value is 10 dB.

6. An audio electronic device, comprising:

a housing provided with a pipeline;

a microphone movably and adjustably provided in the pipeline along a length direction of the pipeline;

a driving device drivingly connected to the microphone to drive a movement of the microphone; and a control device electrically connected to the driving device;

wherein the control device comprises a memory, a processor, and a wind noise control program for the microphone of the audio electronic device stored in the memory; when the wind noise control program for the microphone of the audio electronic device is executed by the processor, the process executes a wind noise control method, the wind noise control method comprising:

obtaining wind noise picked up by the microphone at a current position of the microphone; and in response to that the wind noise at the current position is greater than a first set value, controlling the driving device to drive the microphone until the wind noise at the current position of the microphone is less than a second set value, wherein the second set value is less than or equal to the first set value;

after the in response to that the wind noise at the current position is greater than the first set value, controlling the driving device to drive the microphone until the wind noise at the current position of the microphone is less than the second set value, the method further comprises:

re-obtaining the wind noise picked up by the microphone at the current position of the microphone;

after the re-obtaining the wind noise picked up by the microphone at the current position of the microphone, the method further comprises:

in response to that the wind noise at the current position is less than a third set value, controlling the microphone to move to an initial position, wherein the third set value is less than the second set value.

7. The audio electronic device according to claim 6, wherein the pipeline is provided in an arc shape; the driving device comprises a rotation device and a connection rod, and the connection rod is configured to extend along a radial direction of a rotation shaft of the rotation device; one end of the connection rod is connected to the rotation shaft of the rotation device, and the other end of the connection rod is connected to the microphone.

8. The audio electronic device according to claim 6, wherein the audio electronic device comprises augmented reality (AR) glasses or headphones.

* * * * *